US012058156B2

(12) United States Patent
Fite (10) Patent No.: US 12,058,156 B2
(45) Date of Patent: Aug. 6, 2024

(54) SYSTEM AND METHOD FOR DETECTING AND MITIGATING PORT SCANNING ATTACKS (71) Applicant: EDGEHAWK SECURITY LTD., Tel Aviv (IL)

(72) Inventor: Lior Fite, Zurit (IL)

(73) Assignee: EDGEHAWK SECURITY LTD., Tel Aviv (IL)

( * ) Notice: Subject to any disclaimer, the term of this patent is extended or adjusted under 35 U.S.C. 154(b) by 297 days.

(21) Appl. No.: 17/706,642

(22) Filed: Mar. 29, 2022

(65) Prior Publication Data

US 2023/0319078 A1 Oct. 5, 2023

(51) Int. Cl.
*H04L 9/40* (2022.01)

(52) U.S. Cl.
CPC ...... *H04L 63/1425* (2013.01); *H04L 63/1466* (2013.01)

(58) Field of Classification Search
CPC .............. H04L 63/1425; H04L 63/1466
See application file for complete search history.

(56) References Cited

U.S. PATENT DOCUMENTS

| | | | | |
|---|---|---|---|---|
| 11,916,943 | B2 * | 2/2024 | Comay | H04L 61/5007 |
| 2016/0028632 | A1 * | 1/2016 | Vasseur | H04L 12/28 370/237 |
| 2017/0223052 | A1 * | 8/2017 | Stutz | H04L 63/1491 |
| 2020/0112544 | A1 * | 4/2020 | Smith | H04L 63/0236 |
| 2020/0358817 | A1 * | 11/2020 | Ahluwalia | H04L 61/5046 |
| 2021/0112091 | A1 * | 4/2021 | Compton | H04L 63/1416 |
| 2021/0218658 | A1 * | 7/2021 | Vasseur | H04L 41/149 |
| 2022/0078208 | A1 * | 3/2022 | Anderson | H04L 43/026 |
| 2022/0263861 | A1 * | 8/2022 | Marozas | G06F 21/552 |
| 2023/0115935 | A1 * | 4/2023 | Wahbo | G06N 20/00 726/23 |
| 2023/0188540 | A1 * | 6/2023 | Valluri | H04L 63/145 726/22 |
| 2023/0208857 | A1 * | 6/2023 | Medvedovsky | H04L 63/1458 726/13 |
| 2023/0231857 | A1 * | 7/2023 | Neupane | G06N 3/084 726/22 |
| 2023/0231860 | A1 * | 7/2023 | Tian | G06N 5/022 726/1 |
| 2023/0231874 | A1 * | 7/2023 | St. Pierre | H04L 67/145 726/23 |

(Continued)

*Primary Examiner* — Stephen T Gundry
(74) *Attorney, Agent, or Firm* — AlphaPatent Associates Ltd.; Daniel J. Swirsky (57) ABSTRACT

A method for securing data over a communication network, the method comprising detecting communication data transferred via a router in the communication network, applying an anomaly detection process on the detected communication data to identify malicious data sent via the router, generating a list of candidate Internet Protocol (IP) addresses having a probability of sending malicious data via the router, sending the list of candidates to the router, receiving additional telemetry about data received from the IP addresses included in the list of candidates, narrowing down the list of candidates to a list of verified attackers, generating one or more attack signatures configured to identify the port scanning traffic from the IP addresses included in the list of candidates, sending the one or more attack signatures to the router.

20 Claims, 5 Drawing Sheets

(56) References Cited

U.S. PATENT DOCUMENTS

| | | | |
|---|---|---|---|
| 2023/0244787 A1* | 8/2023 | Yan | G06F 21/566 |
| | | | 726/23 |
| 2023/0254332 A1* | 8/2023 | Rahouti | H04L 63/1416 |
| | | | 726/22 |
| 2023/0254338 A1* | 8/2023 | Melicher | H04L 63/1483 |
| | | | 726/13 |
| 2023/0306114 A1* | 9/2023 | Ji | G06F 21/577 |
| 2023/0379405 A1* | 11/2023 | Chhabra | H04L 61/2528 |
| 2024/0031383 A1* | 1/2024 | Szurdi | G06N 5/025 |

* cited by examiner

SYSTEM AND METHOD FOR DETECTING AND MITIGATING PORT SCANNING ATTACKS

FIELD

The invention relates generally to the field of Cyber Security, and more particularly to methods to detect and mitigate TCP/UDP port scanning to find open ports on hosts

BACKGROUND

Traffic monitoring and analysis is essential for security and management tasks. In high-speeds links it is not always possible to process all the incoming packets and sampling techniques (for example Sampled NetFlow) must be applied to reduce the load on routers. Network operators tend to apply aggressive sampling rates when using NetFlow, for example sampling one packet out of 1000 or out of 4000 in order to handle high traffic scenarios. For this reason, finding port scanning attacks is very challenging. In addition, port scanning attacks result in an adverse effect on internal routing tables. The scanners generate many new short flows (1 or 2 packets per flow) in a short period of time and these flow entries into routers internal tables can occupy up to 70% of the router memory.

Port scanning detection algorithms based on sampled flows are not new, for example Threshold Random Walk (TRW) and Time-based Access Pattern Sequential hypothesis testing (TAPS) has been used for over a decade to detect port scanning attacks using different methods of anomaly detection. However, when sampling rate is very low (1 of 1,000 and below) these methods tend to produce too many "false negatives" and "false positives". Other solutions that use machine learning concepts also tend to be ineffective as each environment is different and there is no general training set that works for all.

SUMMARY

In one aspect of the invention a method is provided for securing data over a communication network, the method including detecting communication data transferred via a router in the communication network, applying an anomaly detection process on the detected communication data to identify malicious data sent via the router, generating a list of candidate Internet Protocol (IP) addresses having a probability of sending malicious data via the router, sending the list of candidates to the router, receiving additional telemetry about data received from the IP addresses included in the list of candidates, narrowing down the list of candidates to a list of verified attackers, generating one or more attack signatures configured to identify the port scanning traffic from the IP addresses included in the list of candidates, sending the one or more attack signatures to the router.

In some cases, the additional telemetry includes a set of parameters including source IP address/port number, destination IP address/port number and a communication protocol used to transfer the data via the router.

In some cases, providing the additional telemetry includes increasing a sampling rate of packets sent from the IP addresses included in the list of candidates.

In some cases, the method further includes monitoring a counter representing a number of times a specific IP address appears in the list of candidates sending malicious data via the router.

In some cases, the anomaly detection process includes detecting an amount of synchronizing acknowledgement messages sent via the router from a specific source IP address.

In some cases, the anomaly detection process includes measuring an amount of echo requests sent from source IP to a plurality of destination IP addresses.

In some cases, the malicious data is sent as part of a port scanning attack.

In some cases, the malicious data is sent from an IP address operating behind a Network Address Translation (NAT) system, and the method further includes detecting information related to packets sent from the NAT system that include legitimate traffic, generating a packet signature that identify only a port scanning traffic and program the router ACL with these signatures to stop the transfer of data from the IP addresses defined as attacking addresses.

In some cases, sending the list of candidates to the router via a software-defined network protocol capable of configuring the router.

In some cases, the software-defined network protocol is Netconf. There may be other SDN protocols to configure the router to set the ACLs.

In another aspect of the invention a router device having a programmable memory is provided, including a processor configured to perform instructions, the instructions including detecting communication data transferred via the router, applying an anomaly detection process on the detected communication data to identify malicious data sent via the router, generating a list of candidate Internet Protocol (IP) addresses having a probability of sending malicious data via the router, processing additional telemetry about data received from the IP addresses included in the list of candidates, generating one or more attack signatures configured to identify the port scanning traffic from the IP addresses included in the list of candidates.

BRIEF DESCRIPTION OF THE DRAWINGS

Figure 1A:
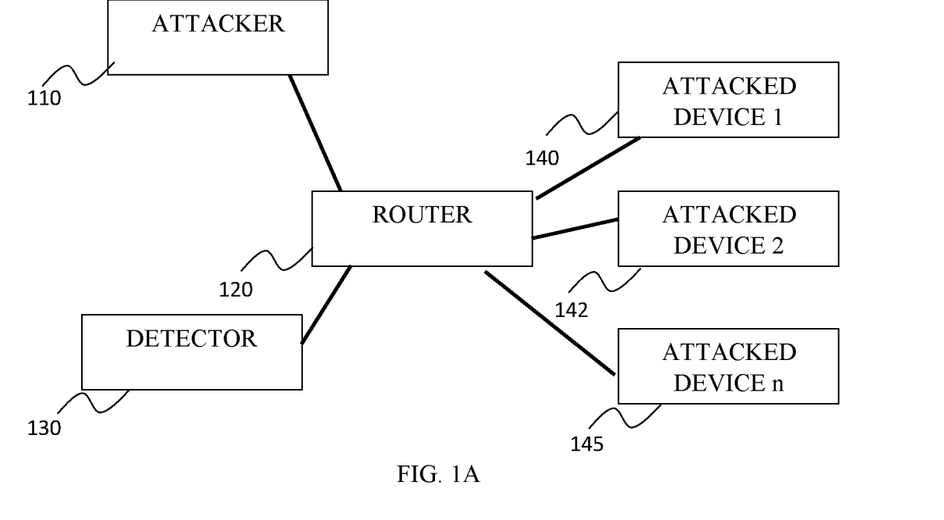
Figure 1B:
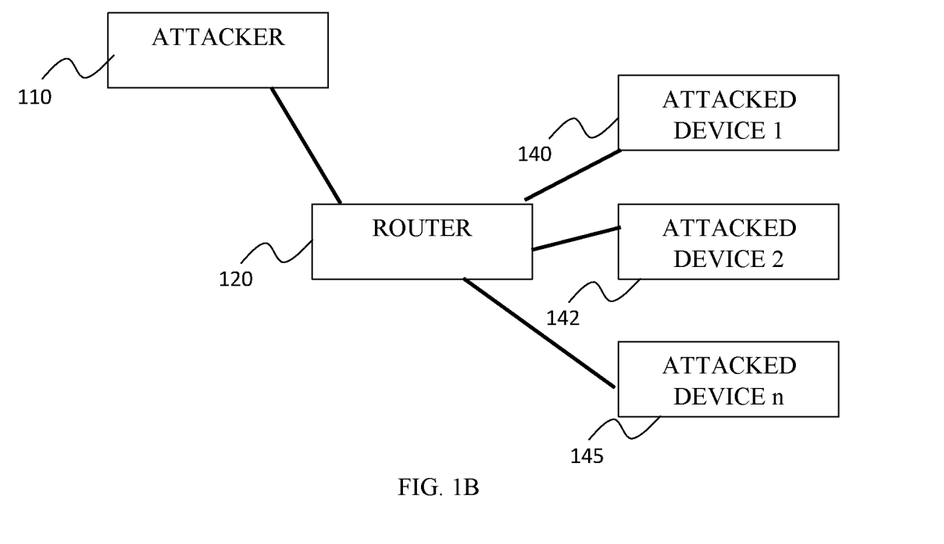
Figure 2:
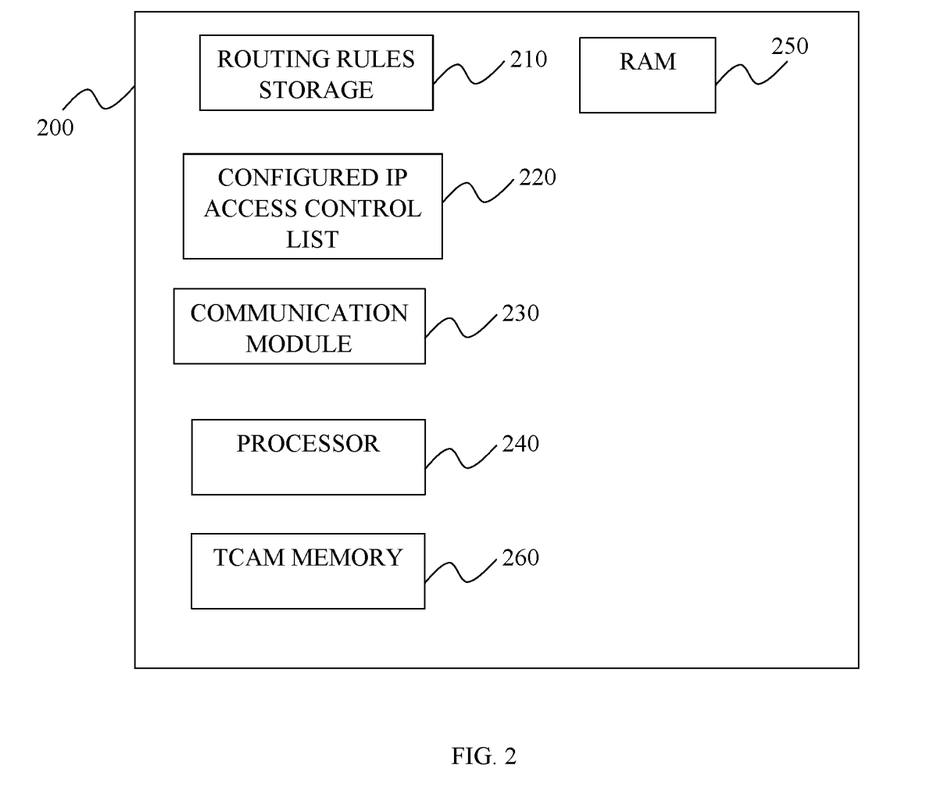
Figure 3:
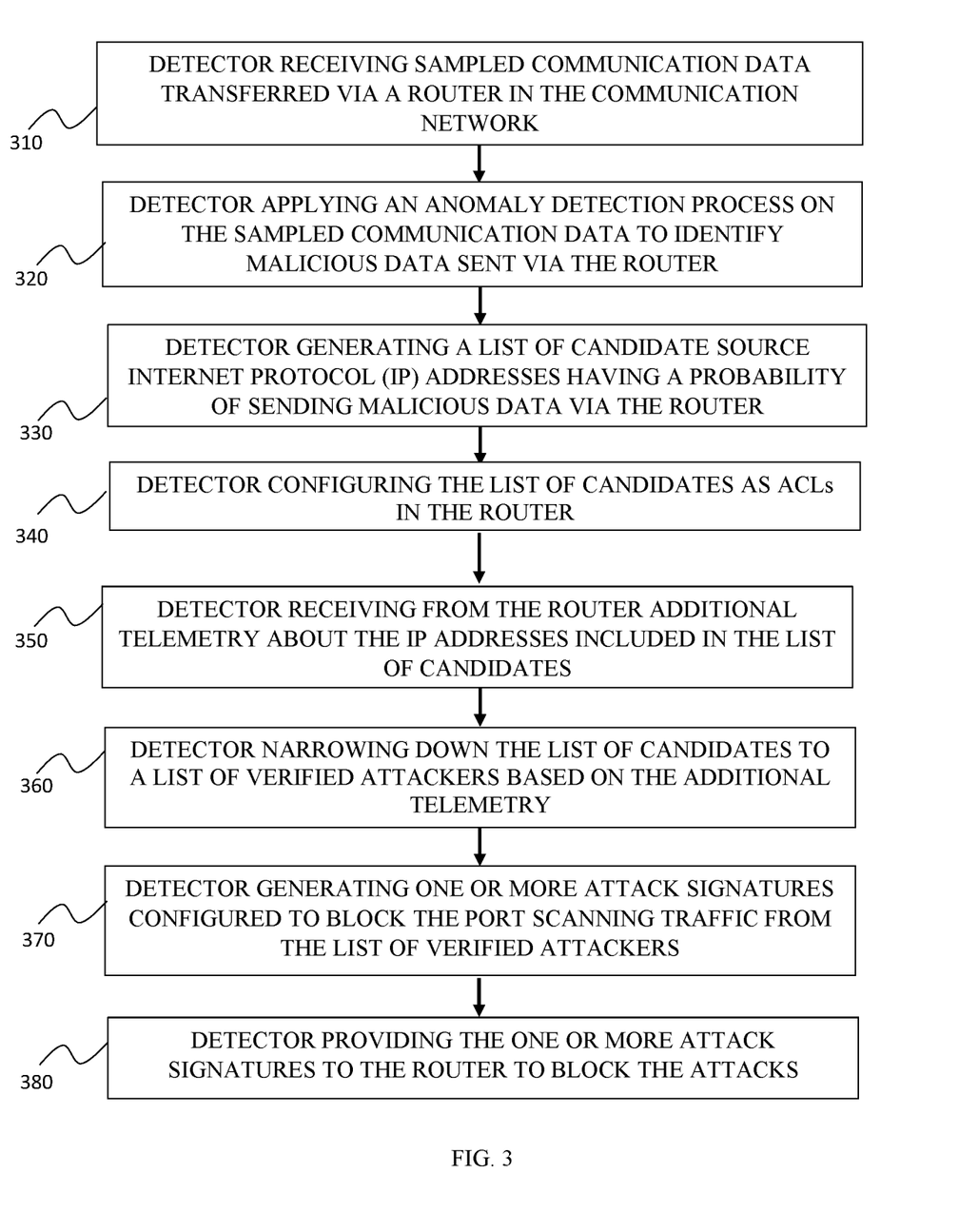
Figure 4:
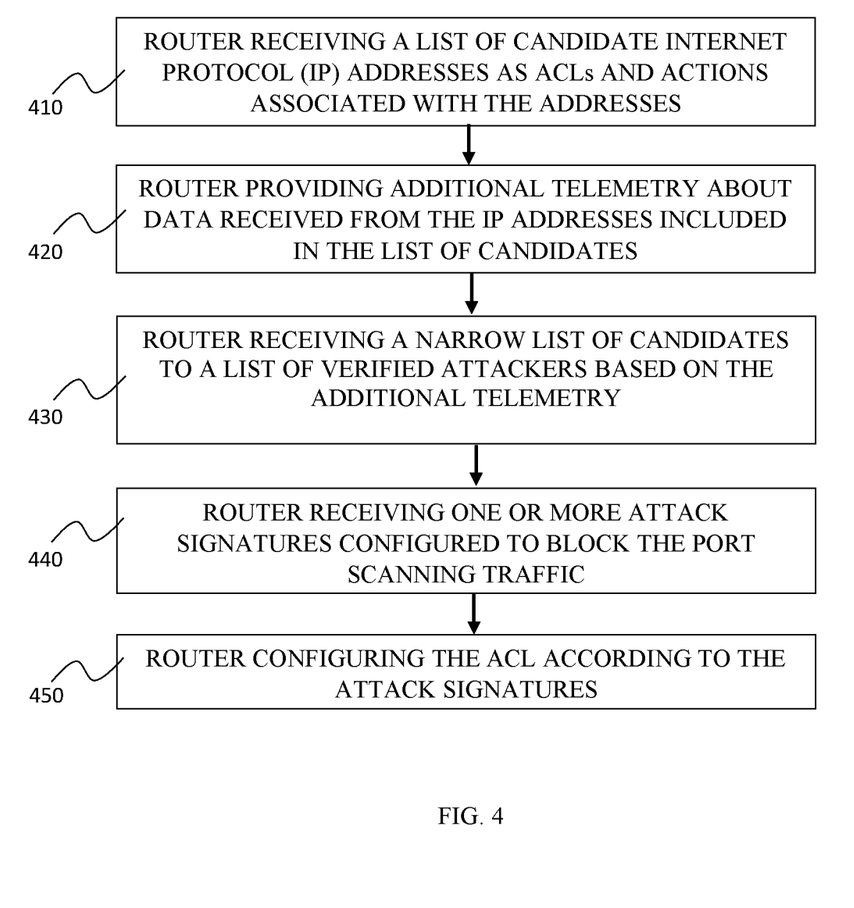
Figure 5:
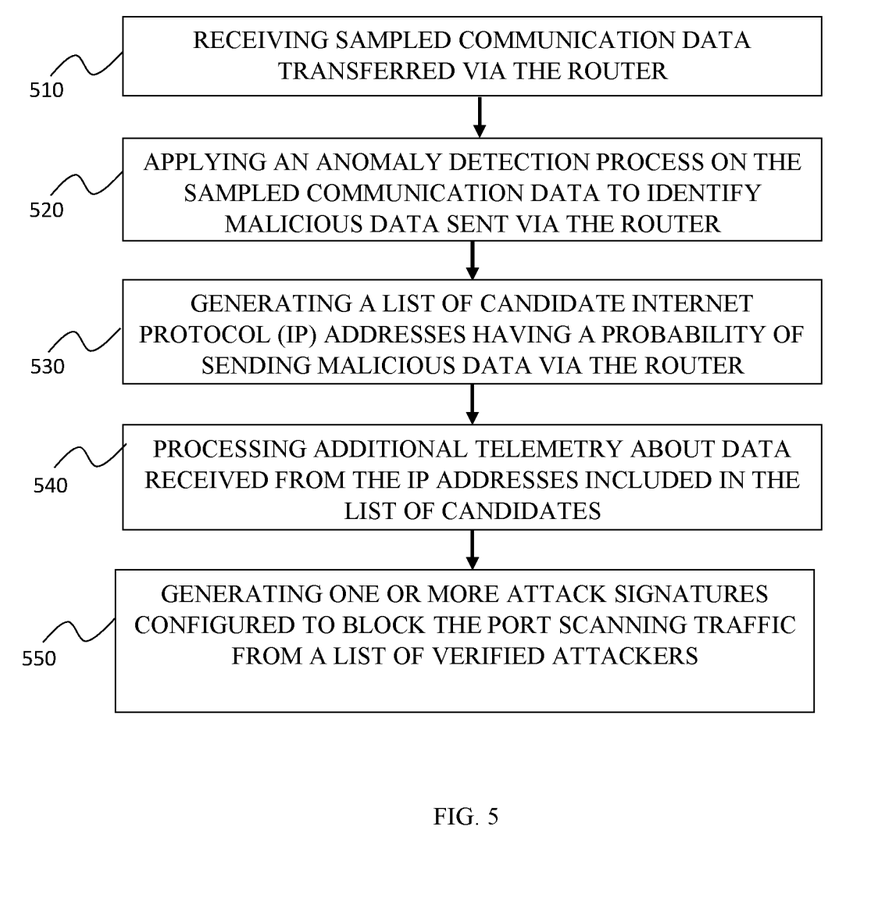

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings FIGS. 1A-1B shows computerized environments for detecting and mitigating port scanning attacks, according to exemplary embodiments of the invention, FIG. 2 schematically shows computerized components of a router device used for detecting and mitigating port scanning attacks, according to exemplary embodiments of the invention, FIG. 3 shows a method for detecting and mitigating port scanning attacks by a standalone detector communicating with a router device, according to exemplary embodiments of the invention, FIG. 4 shows a method for detecting and mitigating port scanning attacks by a router device communicating with a standalone detector, according to exemplary embodiments of the invention, and FIG. 5 shows a method for detecting and mitigating port scanning attacks by a router device having internal detection capabilities, according to exemplary embodiments of the invention.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

The invention, in embodiments thereof, provides a system and method for securing data over a communication network. The method includes detecting communication data transferred via a router in the communication network and applying an anomaly detection process on the detected communication data to identify malicious data sent via the router. Then, the method includes generating a list of candidate Internet Protocol (IP) addresses having a probability of sending malicious data via the router. The list may be sent to the router in case the list is created by a standalone device communicating with the router. The router is configured based on the list and provided additional telemetry from the candidate IP addresses. Then, the method includes receiving additional telemetry about data received from router on the IP addresses included in the list of candidates and narrowing down the list of candidates to a list of verified attackers. Then, the method includes generating one or more attack signatures configured to identify the port scanning traffic from the IP addresses included in the list of candidates and optionally sending the one or more attack signatures to the router.

The invention, in embodiments thereof, uses recent developments in router technology that include the introduction of Ternary Content-Addressable Memory (TCAM) and the introduction of Software-defined networking (SDN) technology to program routers in real time software-defined network. These two tools create opportunities for new methods to be developed to detect and mitigate port scanning attacks.

FIGS. 1A-1B shows computerized environments for detecting and mitigating port scanning attacks, according to exemplary embodiments of the invention. FIG. 1A discloses a detector 130 used to process the sampled packets transferred via the router 120. The sampled packets may be provided according to a communication protocol, such as NetFlow, Sflow, or any other sampling process or protocol. The router 120 receives packets from multiple source devices, for example from an attacker device 110. The attacker device 110 sends packets via the router 120 in order to identify open ports in various devices 140, 142, 145 connected to the communication network. The communication network may be the internet, internet exchange (peering), may be a cellular network, a Local Access Network (LAN) and the like. The various devices 140, 142, 145 may be virtual workloads residing in public cloud or private cloud or local data center, servers, personal computers, laptops, machines connected to the communication network such as manufacturing machines, sensors and the like.

The sampled packets sent via the router 120 are transferred to the detector 130 for initial detection. The router 120 provides the detector with additional telemetry about a restricted list of suspicious IP addresses. The additional telemetry may be all packets sent from the IP addresses in the list, or a sampling rate significantly higher than the sampling rate in which data is sent to the detector before creation of the list of suspicious IP addresses. Based on the additional telemetry, the detector 130 may create attack signatures configured to identify the port scanning traffic from the IP addresses included in the list of candidates. In some cases, one device creates the list of suspicious IP addresses and another device creates the attack signatures. The detector 130 may be a virtual workloads residing in public cloud or private cloud or local data center, a server, a laptop, a personal computer or any other electronic device having a computerized memory for storing a set of instructions disclosed herein and a processor for executing the instructions.

FIG. 1B shows an architecture in which the router device 120 has the capabilities to perform the processes performed by the detector 130, mainly creates the list of suspicious IP addresses and another device creates the attack signatures. It should be noted that the invention covers both options, one in which these processes are performed by the router device 120 and another option in which these processes are performed outside the router device 120.

FIG. 2 schematically shows computerized components of a router device used for detecting and mitigating port scanning attacks, according to exemplary embodiments of the invention.

The router 200 includes a routing storage rules 210. The routing storage rules 210 dictate how the data is transferred via the router, for example priorities for sending the data, congestion control rules, transmission rates and the like.

The router 200 includes one or more configured Access Control Lists (ACLs) 220. The ACL list includes one or more of the packet header, payload fields or combination of them, for example (but not limited) such fields may include source IP, destination IP, Protocol, Port, TCP flags and optionally an action associated with each of the entries on the list. The action may very among the addresses, for example blocking communication, packet counter, byte counter, packet mirroring, delaying communication, reducing transmission rate of packets sent and the like.

The one or more ACLs are configured to filter packets based on one or more of the packet header a payload fields or combination of them, for example (but not limited) such fields may include source IP, destination IP, Protocol, Port, TCP flags and any combination of these items. In order to filter network traffic, ACLs control whether routed packets are forwarded, rate limited or blocked at the router interface. The router examines each packet in order to determine whether to forward, rate limit or drop the packet based on the criteria that is specified within the ACL.

The router 200 includes a communication module 230. The communication module is configured to receive data and to transmit data. The communication module 230 may use any communication technique or protocol desired by a person skilled in the art, such as wireless signals, cellular communication, WAN, LAN, optical fibers and the like.

The router 200 includes a processor 240 configured to execute a set of instructions stored in the router, or in another device, in order to perform the processes disclosed herein. The processor may be a hardware-based processor, a microprocessor, a general purpose processor and the like.

The router 200 includes RAM 250 configured to store data, such as rules and instructions executed by the processor 240 when performing the processes disclosed herein. The RAM 250 may represent any kind of memory storage that can be updated by software commands.

The router 200 includes TCAM memory 260. The Ternary Content-Addressable Memory (TCAM) 260 is a specialized type of high-speed memory that searches its entire contents in a single clock cycle. The term "ternary" refers to the memory's ability to store and query data using three different inputs 0, 1 and X.

FIG. 3 shows a method for detecting and mitigating port scanning attacks by a standalone detector communicating with a router device, according to exemplary embodiments of the invention.

Step 310 discloses the Detector receiving sampled communication data transferred via a router in the communication network. The sampling may be performed by randomly sampling data sent via the router. The sampling rate may be in the range of 110 up to 150,000 of all packets transferred via the router. Receiving may be done by copying the sampled data and sending the copied data to another device, such as the detector 130, or copying the sampled data into a memory address of the router, the memory address is used by the router's processor to process the sampled data.

Step 320 discloses applying an anomaly detection process on the sampled communication data to identify malicious data sent via the router. The anomaly detection process may be implemented as a function receiving one or more properties of the detected data. The anomaly detection algorithm may use data collected over time. The collected data may include multiple traffic properties, for example, but not limited to—measuring the amount of Synchronizing messages and synchronization acknowledgement messages received from a specific IP address, and the ratio between the Synchronizing messages and synchronization acknowledgement messages. The anomaly detection may include measuring the TCP/UDP port distribution of Synchronizing messages synchronization acknowledgement messages only between multiple source IP addresses that generate the sampled data. The anomaly detection may also include measuring the amount of echo requests sent from source IP to a plurality of destinations.

Step 330 discloses generating a list of candidate Internet Protocol (IP) addresses having a probability of sending malicious data via the router. In some cases, generating the list may include assigning a score the IP addresses based on the anomaly detection and including in the list only the source IP addresses having a score higher than a threshold, or lower than a threshold. In some cases, the number of candidate IP addresses may be limited, for example, according to network properties, router's properties, in response to an event, amount of traffic passing via the router, amount of source IP address that sends data via the router, and the like. The list may be stored in a memory address of the router.

Step 340 discloses configuring the list of candidates as ACLs in the router. The configuration may be done by sending a message over the communication network, for example via a dedicated software application, or by sending a command to change a memory address in the router that is configured to store the list of ACLs.

Step 350 discloses receiving additional telemetry about data received from the configured ACL list. Upon receiving the list of ACLs, the router configures the ACL unit based on the list. The list of ACLs regarding the specific IP addresses may be, for example <ACL with source IP address, protocol=TCP, flags=SYN or ACK or FIN and the action is to send packet count and byte count>. This way, the detector may collect additional telemetry that allows for accurate detection of the scanning source.

Step 360 discloses narrowing down the list of candidates to a list of verified attackers based on the additional telemetry. The additional telemetry enables the detector to have a sufficient amount of data required to estimate, to a higher degree, that a specific source IP address is indeed an attacker.

Step 370 discloses generating one or more attack signatures configured to block the port scanning traffic from the IP addresses included in the list of candidates. The attack signatures may include an IP address, or other fields, such as source IP, destination IP, protocol, source port, destination port, title, packet length and more or a combination of any of the fields. Blocking may be performed by adding an action for the router when a packet is received that matches the attack signature ACL. The action may be blocking communication, delaying communication, reducing transfer rate, copying the packet for monitoring, and the like.

Step 380 discloses sending one or more attack signatures ACLs to the router. Sending the one or more attack signatures ACLs may be done by sending a message over the communication network, for example via a dedicated software application, or by sending a command to change a memory address in the router that is configured to store one or more attack signatures ACLs.

FIG. 4 shows a method for detecting and mitigating port scanning attacks by a router device communicating with a standalone detector, according to exemplary embodiments of the invention.

Step 410 discloses receiving a list of candidate Internet Protocol (IP) addresses as ACLs and actions associated with the addresses. The list of source IP addresses may be provided to the router along with actions associated with the addresses. The list of IP addresses is applied to the router's ACL (access control list) which controls transfer of data from the IP addresses on the list accordingly. At first, the router only provides additional telemetry concerning the addresses on the list, as disclosed in step 420.

Step 420 discloses providing additional telemetry about data received from the IP addresses included in the list of candidates. The additional telemetry may be defined as increasing the sampling rate of data sent from the IP addresses on the list. The additional telemetry may be limited to a specific rule, such as "provide only data which a specific command from the IP address".

Step 430 discloses narrowing down the list of candidates to a list of verified attackers based on the additional telemetry. The additional telemetry enables the detector to have a sufficient amount of data required to estimate, to a higher degree, that a specific IP address is indeed an attacker.

Step 440 discloses generating one or more attack signatures configured to block the port scanning traffic from the IP addresses included in the list of candidates. The attack signatures may include more than just IP addresses, for example in case the attacker hides behind a NAT system Step 450 discloses configuring the router's ACL according to the attack signatures. The configuration may include actions such as blocking packets having the attack signature, delaying packets having the attack signature, reducing transmission rates of packets sent from the IP address or packets having the attack signature.

FIG. 5 shows a method for detecting and mitigating port scanning attacks by a router device having internal detection capabilities, according to exemplary embodiments of the invention.

Step 510 discloses receiving sampled communication data transferred via the router. The sampling may be performed by randomly sampling data sent via the router. The sampling rate may be in the range of 1500 up to 110,000 of all packets transferred via the router. Receiving may be done by copying the sampled data and sending the copied data to another device, such as the detector 130, or copying the sampled data into a memory address of the router, the memory address is used by the router's processor to process the sampled data.

Step 520 discloses applying an anomaly detection process on the sampled communication data to identify malicious data sent via the router. The anomaly detection process may be implemented as a function receiving one or more properties of the detected data. The anomaly detection algorithm may use data collected over time. The collected data may include multiple traffic properties, for example, but not limited to—measuring the amount of Synchronizing messages and synchronization acknowledgement messages received from a specific IP address, and the ratio between the Synchronizing messages and synchronization acknowledgement messages. The anomaly detection may include measuring the TCP/UDP port distribution of Synchronizing messages synchronization acknowledgement messages only between multiple source IP addresses that generate the sampled data. The anomaly detection may also include measuring the amount of echo requests sent from source IP to a plurality of destinations.

Step 530 discloses generating a list of candidate Internet Protocol (IP) addresses having a probability of sending malicious data via the router. In some cases, generating the list may include assigning a score the IP addresses based on the anomaly detection and including in the list only the source IP addresses having a score higher than a threshold, or lower than a threshold. In some cases, the number of candidate IP addresses may be limited, for example according to network properties, router's properties, in response to an event, amount of traffic passing via the router, amount of source IP that send data via the router, and the like. The list may be stored in a memory address of the router.

Step 540 discloses processing additional telemetry about data received from the IP addresses included in the list of candidates. The additional telemetry includes information that is not included under Netflow or sFlow, or another industry standard for monitoring packets sent over a communication network. The additional telemetry may include TCP counters, a specific 5 tuple+some TCP flags and the like. The additional telemetry may include a higher sampling rate of packets sent from the IP addresses on the list of candidate IP addresses. For example, in case the sampling of step 510 is 1 packet of 1,000, the sampling on step 540 is in the range of 12 to 110 (sampling one packet of 2, or sampling one packet of 10). In some other cases, the additional telemetry may include a rule, such as "send all packets from a specific IP address that include a synchronization message".

Step 550 discloses generating one or more attack signatures configured to block the port scanning traffic from the IP addresses included in the list of candidates. The attack signatures may include an IP address, or other fields, such as source IP, destination IP, PROTOCOL, source port, destination port, title, packet length and more. The attack signature may be any combination of the fields. Blocking may be performed by adding an action for the router when a packet is received that matches the attack signature. The action may be blocking communication, delaying communication, reducing transfer rate, copying the packet for monitoring and the like.

It should be understood that the above description is merely exemplary and that there are various embodiments of the invention that may be devised, mutatis mutandis, and that the features described in the above-described embodiments, and those not described herein, may be used separately or in any suitable combination, and the invention can be devised in accordance with embodiments not necessarily described above.

While the disclosure has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the invention is not limited to the particular embodiments disclosed herein for carrying out this invention.

What is claimed is:

1. A method for securing data over a communication network, the method comprising:
   detecting communication data transferred via a router in the communication network;
   applying an anomaly detection process on the detected communication data to identify malicious data sent via the router;
   generating a list of candidate Internet Protocol (IP) addresses having a probability of sending malicious data via the router;
   sending the list of candidates to the router;
   receiving additional telemetry about data received from the IP addresses included in the list of candidates;
   narrowing down the list of candidates to a list of verified attackers;
   generating one or more attack signatures configured to identify the port scanning traffic from the IP addresses included in the list of candidates; and
   sending the one or more attack signatures to the router,
   wherein the anomaly detection process comprises measuring an amount of echo requests sent from source IP to a plurality of destination IP addresses.

2. The method of claim 1, wherein the additional telemetry comprises a set of parameters including source IP address/port number, destination IP address/port number and a communication protocol used to transfer the data via the router.

3. The method of claim 1, wherein providing the additional telemetry comprises increasing a sampling rate of packets sent from the IP addresses included in the list of candidates.

4. The method of claim 1, further comprising monitoring a counter representing a number of times a specific IP address appears in the list of candidates sending malicious data via the router.

5. The method of claim 1, wherein the anomaly detection process comprises detecting an amount of synchronizing acknowledgement messages sent via the router from a specific source IP address.

6. The method of claim 1, wherein the malicious data is sent as part of a port scanning attack.

7. The method of claim 1, wherein the malicious data is sent from an IP address operating behind a Network Address Translation (NAT) system, the method further comprising:
   detecting information related to packets sent from the NAT system that include legitimate traffic; and
   generating a packet signature that identify only a port scanning traffic and program the router ACL with these signatures to stop the transfer of data from the IP addresses defined as attacking addresses.

8. The method of claim 1, wherein sending the list of candidates to the router via a software-defined network protocol capable of configuring the router.

9. The method of claim 8, wherein the software-defined network protocol is Netconf.

10. A method for securing data over a communication network, the method comprising:
- detecting communication data transferred via a router in the communication network;
- applying an anomaly detection process on the detected communication data to identify malicious data sent via the router;
- generating a list of candidate Internet Protocol (IP) addresses having a probability of sending malicious data via the router;
- sending the list of candidates to the router;
- receiving additional telemetry about data received from the IP addresses included in the list of candidates;
- narrowing down the list of candidates to a list of verified attackers;
- generating one or more attack signatures configured to identify the port scanning traffic from the IP addresses included in the list of candidates;
- sending the one or more attack signatures to the router;
- detecting information related to packets sent from the NAT system that include legitimate traffic; and
- generating a packet signature that identify only a port scanning traffic and program the router ACL with these signatures to stop the transfer of data from the IP addresses defined as attacking addresses.

11. The method of claim 10, wherein the additional telemetry comprises a set of parameters including source IP address/port number, destination IP address/port number and a communication protocol used to transfer the data via the router.

12. The method of claim 10, wherein providing the additional telemetry comprises increasing a sampling rate of packets sent from the IP addresses included in the list of candidates.

13. The method of claim 10, further comprising monitoring a counter representing a number of times a specific IP address appears in the list of candidates sending malicious data via the router.

14. The method of claim 10, wherein the anomaly detection process comprises detecting an amount of synchronizing acknowledgement messages sent via the router from a specific source IP address.

15. The method of claim 10, wherein the anomaly detection process comprises measuring an amount of echo requests sent from source IP to a plurality of destination IP addresses.

16. A method for securing data over a communication network, the method comprising:
- detecting communication data transferred via a router in the communication network;
- applying an anomaly detection process on the detected communication data to identify malicious data sent via the router;
- generating a list of candidate Internet Protocol (IP) addresses having a probability of sending malicious data via the router;
- sending the list of candidates to the router;
- receiving additional telemetry about data received from the IP addresses included in the list of candidates;
- narrowing down the list of candidates to a list of verified attackers;
- generating one or more attack signatures configured to identify the port scanning traffic from the IP addresses included in the list of candidates; and
- sending the one or more attack signatures to the router,
- wherein sending the list of candidates to the router via a software-defined network protocol capable of configuring the router.

17. The method of claim 16, wherein the software-defined network protocol is Netconf.

18. The method of claim 16, wherein the additional telemetry comprises a set of parameters including source IP address/port number, destination IP address/port number and a communication protocol used to transfer the data via the router.

19. The method of claim 16, wherein providing the additional telemetry comprises increasing a sampling rate of packets sent from the IP addresses included in the list of candidates.

20. The method of claim 16, further comprising monitoring a counter representing a number of times a specific IP address appears in the list of candidates sending malicious data via the router.

* * * * *